INVENTORS
HERMANN OBERST
LEONHARD REIHS
JOACHIM EBIGT
GÜNTHER DUVE
ALFRED SCHOMMER

BY *Curtis, Morris & Safford*
ATTORNEYS

VIBRATION DAMPED SANDWICH SYSTEMS HAVING INTERLAYERS OF COPOLYMERS OF ETHYLENE AND MIXTURES OF ISONONANE-, ISODECANE AND ISOUNDECANE-CARBOXYLIC ACID VINYLESTERS

This is a continuation-in-part of copending application Ser. No. 630,963, filed Apr. 14, 1967 and now abandoned.

The present invention provides vibration damped sandwich systems having interlayers made of copolymers of ethylene with mixtures of isononane-, isodecane- and isoundecane-carboxylic acid vinyl esters.

It is known from South African Pat. No. 5,269 that highly valuable vibration damping materials of a broad temperature and suitable for damping bending vibrations of metal sheet constructions can be prepared by a copolymerization of monomers whose homopolymers differ in their second order transition temperature by at least 20° C. This patent also indicates that as vibration damping materials having a broad temperature band there are used, among others, predominantly amorphous copolymers of ethylene and vinyl esters of fatty acids containing two or three carbon atoms, for example vinyl acetate-ethylene copolymers. The vinyl acetate-ethylene copolymers hitherto used, however, have not been able to meet all technical requirements.

It has now been found that copolymers of ethylene and mixtures of vinyl esters of carboxylic acids having nine and more carbon atoms, exhibit surprisingly good damping properties and thus are especially suitable for damping vibrations of metal sheets. With the use of these copolymers whose vibration damping efficiency depends critically on the weight proportion of the monomers, very broad damping curves and very high maximum values of damping can be obtained. From the economical point of view they moreover offer the advantage of a reasonable price.

Thus, copolymers of, preferably, 5 to 40 percent by weight of ethylene and 95 to 60 percent by weight of a mixture of isononane-, isodecane- and isoundecane-carboxylic acid vinyl esters, are excellent damping materials having a broad temperature band, which can be used within a considerably large temperature range. To obtain an improved adhesion in addition, it is possible also to incorporate by polymerization up to 5 percent by weight of acrylic and/or methacrylic acid.

According to the present invention, sandwich systems of hard plates, in particular metal sheets, having vibration damping self-adhesive interlayers of ethylene-vinyl esters copolymers can be obtained, said interlayers consisting of copolymers of 5 to 40 percent by weight of ethylene, 95 to 60 percent by weight of a mixture of isononane-, isodecane- and isoundecane-carboxylic carboxylic acid vinyl esters and 0 to 5 percent by weight of acrylic and/or methacrylic acid.

The following example sets forth a satisfactory procedure for preparing copolymers of versatic-(9–11) acid vinyl ester and ethylene. Other known polymerization techniques can also be used to prepare the polymers.

EXAMPLE I

A mixture of 1,200 g. of tert. butanol and 50 g. water was placed into a heatable, 5-liter, refined-steel, high-pressure autoclave. The pH value of the mixture was adjusted to 4.0 by means of aqueous hydrochloric acid. The whole was then heated to 65° C. and an ethylene pressure of 50 atm. was established. A solution of 7.0 g. of azodiiso-butyronitrile in 1,000 g. of versatic-(9–11) acid vinyl ester was added over a period of 3 hours. The reaction temperature and the ethylene pressure were kept constant. Subsequently, the mixture was allowed to react further under the same conditions for 3 hours. The mixture was then cooled, relieved or pressure, and the copolymer was isolated from the reaction mixture by removing the solvent and residual monomers under reduced pressure. The resulting copolymer contained about 20 percent ethylene. The molecular weight was about 700,000.

The molecular weights of the products should be more than 500,000, and preferably should be in the range of 700,000 to 1,500,000.

In the accompanying drawing, FIGS. 1a and 1b are plots showing the loss modulus $d_{comb}$ as a function of temperature.

A comparison of FIGS. 1a and 1b illustrates the superior efficiency of the novel systems. The curve in FIG. 1a shows the loss factor $d_{comb}$ of a metal sheet arrangement of the invention as a function of temperature. It is, for example compared with one of the most effective vibration damping materials known for metal sheet arrangements, namely a modified vinyl acetate copolymer containing plasticizers (curve in FIG. 1b). The copolymer shown in the curve of FIG. 1b is a thermoplastic adhesive especially suitable for preparing vibration damped metal sheet arrangements comprising two outer metal sheets and a self-adhesive thermoplastic as the vibration damping interlayer. Systems of this type provide a damping effect which is extremely high in its maximum and cannot be exceeded for physical reasons (cf. H. Oberst and A. Schommer, Kunststoffe 55, 634 (1965), especially FIG. 9). In a symmetrical arrangement comprising two metal sheets, each of a thickness of 0.5 millimeter, and an interlayer of a thickness of 0.3 millimeter, the loss factor $d_{comb}$ of the combined system, measured in the bending resonance method (cf. for example H. Oberst, L. Bohn and F. Lindhardt, Kunststoffe 51, 495 (1961)), almost reaches the value $d_{comb}$ of 1. The known metal sheet constructions damped by one-sided damping coatings which are applied as layers of so-called vibration damping materials capable of being sprayed, trowelled or bonded, show loss factors generally less than $d_{comb}=0.2$, the combined system having a technically reasonable thickness of the coating or ratio of coating mass to plate mass. By means of the metal sheet sandwich systems which gain a growing importance in recent times, it is possible to obtain damping values increased by a multiple, when the interlayer material is chosen in the most appropriate composition and thickness, as is shown in the example cited herein.

The temperature bandwidth of the damping in the metal sheet sandwich system does not only depend on the viscoelastic values of the interlayer and of the steel sheets, but, to a considerable extent, also on the "geometry" of the arrangement, i.e., on the ratio of the layer thicknesses (see cited literature (1965) FIGS. 8 to 10). In the case of metal sheet sandwich systems, it is advantageous to define the bandwidth to be the range of the temperature interval within which the value $d_{comb}=0.05$ is exceeded. The damping effect of metal sheets which are not damped by additional vibration damping means in metal sheet constructions of a different kind, corresponds to values $d_{comb}=0.01$ and less. The reference value $d_{comb}=0.05$ thus means a considerable increase in the damping effect (by about 15 db. (decibel)) as compared to the "nil damping" $d_{comb}=0.01$.

In the curve shown in FIG. 1b, the reference value $d_{comb}=0.05$ is exceeded in the mainly interesting frequency range of from 100 to 1,000 c.p.s. (Hz.) at temperatures ranging from about 0° to 50° C., the temperature bandwidth therefore amounts to about 50° C. It is for this reason that sandwich systems of this type are suitable for many technical fields of application. By modifying the content of plasticizers, it is possible to shift the temperature band of a high damping effect to higher temperatures and thus to adapt it to special technical uses, for example in machine units operating at elevated temperatures. This construction mode of metal sheet sandwich systems comprising a self-adhesive interlayer of the most appropriate composition and thickness, of a vibration damping material having a broad temperature band and being prepared by copolymerization of appropriate monomeric components, has hitherto not been excelled by other arrangements of a similar kind and can therefore be regarded as a standard system which can serve for judging the acoustic efficiency of the system of the invention by comparison.

FIGS. 1a and 1b show the temperature curves of the loss factor $d_{comb}$ of metal sheet sandwich system comprising steel sheets of a thickness of 0.5 millimeter each and damping interlayers of a thickness of 0.3 millimeter within a frequency range of from 100 to 1,000 c.p.s. The curves have been measured in sandwich systems comprising 1a) a copolymer of 10 percent by weight of ethylene and 90 percent by weight of a mixture of isononane-, isodecane- and isoundecane-carboxylic acid vinyl esters as an interlayer (according to the present invention) and 1b) a modified vinyl acetate copolymer containing plasticizers, as an interlayer.

The arrangement 1a) of the invention, whose monomer proportion lies in the optical range, shows a very broad temperature band and very high maximum values of damping which correspond, to a certain extent, to those of arrangement 1b). The damping center lies at a temperature ranging from 10° to 20° C., with maximum values in the range of from 0.5 to 0.8. The temperature bandwidth is 85° C. for 100 c.p.s. (Hz.) and 65° C. for 1,000 c.p.s. As to low temperatures, the application range reaches down to a temperature of −15° C. The excellent vibration damping properties are preserved up to a medium temperature of about 55° C.

A particular advantage of this vibration damping material resides in the fact that it is perfectly suitable for being applied continuously in the mass production of sandwich metal sheets. It also is a thermoplastic adhesive which can be applied to the metal sheets by trowelling, brushing or pouring at elevated temperatures. The sandwich system is then advantageously cooled under pressure between rolls. Except for decreasing the metal sheets do neither require a preliminary treatment nor another bond. Copolymers containing acrylic or methacrylic acid groups may even do without degreasing. An excellent adhesion is achieved.

The vibration damping material has a good resistance to flow which may still be improved in the copolymers containing carboxyl groups, by a slight cross-linking, for example with epoxides or isocyanates. The sandwich metal sheets can be processed in a manner corresponding, within wide limits, to that of usual metal sheets, i.e., they may be creased, bent, shaped, welded and riveted. Unless their curvature radii are too narrow, they may even be formed with plug and ring. There are obtained sandwich metal sheets of general use, having such a high damping effect and such a broad temperature range of damping as are well sufficient for most fields of application.

Small amounts of fillers, for example for improving the electric conductivity (improvement of the resistance welding) may be added to the vibration damping material. For not adversely affecting the damping effect, it is advantageous to add less than 1 percent by weight, preferably less than 0.5 percent by weight calculated on the polymer, of the filler amount. Appropriate fillers are, for example, heavy spar, silicic acid, graphite and soot.

The total thickness of the sandwich system of the invention preferably ranges between 1 and 6 millimeters. The interlayers may be in the range of from 0.1 to 1 millimeter, preferably from 0.2 to 0.5 millimeter. The maximum damping effect is obtained in symmetrical sandwich systems. The stiffness in flexure and stability, however, are higher in asymetric sandwich arrangements having the same weight. These asymmetric sandwich systems are therefore preferred for uses which require the highest possible stability, calculated on the weight. The ratio between the thicknesses of, for example metal sheets, preferably ranges between 1:1 and 1:4.

Figure 2A:
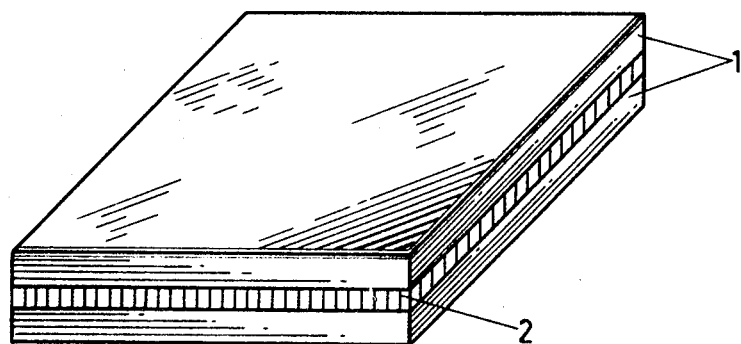
FIG. 2a shows a sandwich system of the invention in a symmetrical arrangement.
Figure 2B:
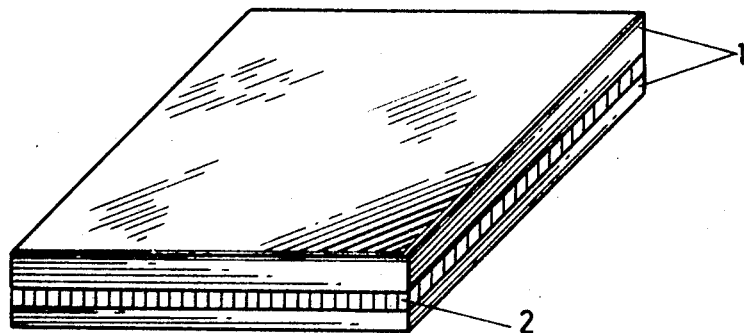
FIG. 2b shows a sandwich system in an asymmetric arrangement. The two outer plates or sheets (1) have the vibration damping layer (2) therebetween.
Figure 1A:
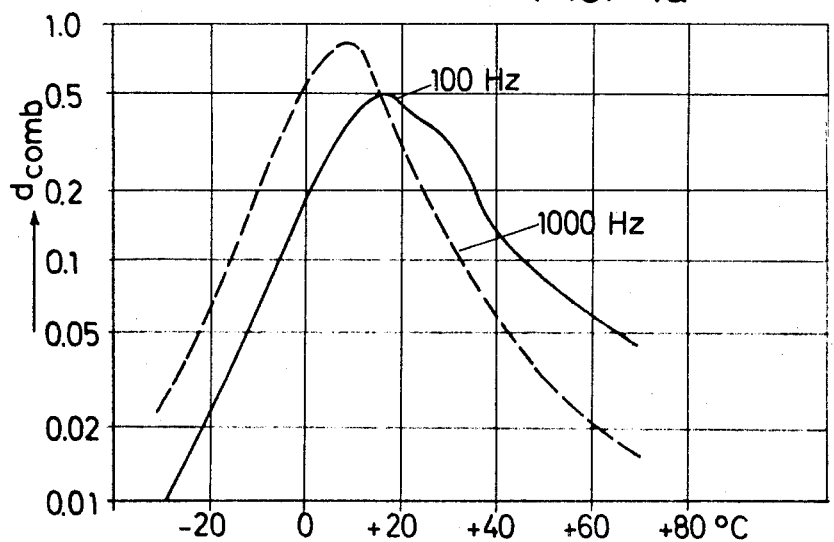
Figure 1B:
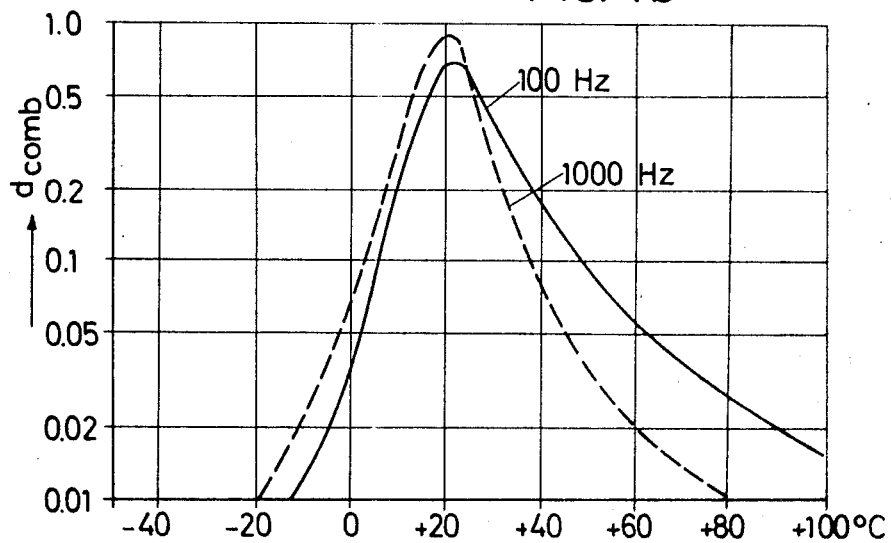
Figure 2A:
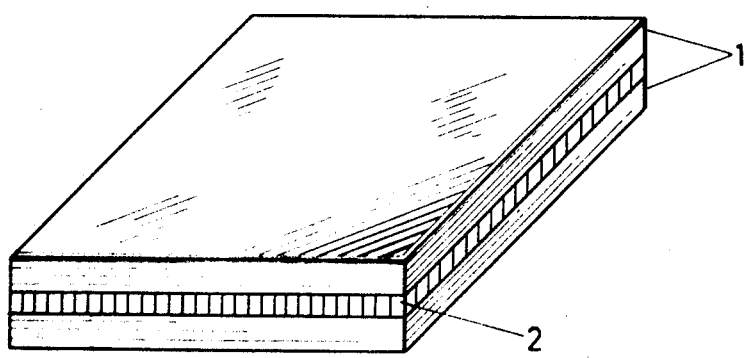
Figure 2B:
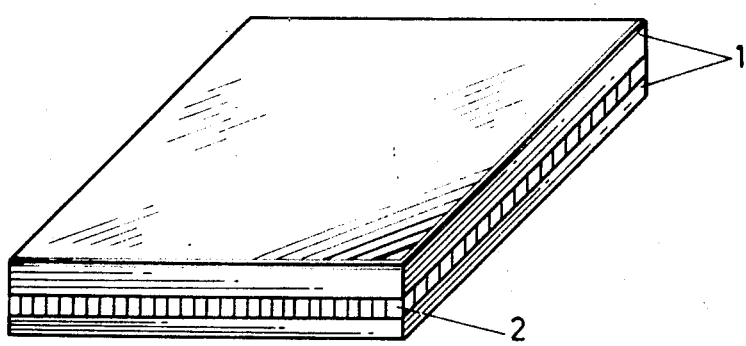

What is claimed is:

1. In a vibration damped sandwich system including hard plates and a vibration damping interlayer, said interlayer having improved damping effect within a broad temperature range, comprising: a copolymer of 5 to 40 percent by weight ethylene and 95 to 60 percent by weight of a mixture of isononane-, isodecane- and isoundecane-carboxylic acid vinyl esters.

2. An improved vibration damping interlayer as recited in claim 1, wherein the copolymer containing up to 1 percent by weight, calculated on the copolymer, of a filler selected from the group consisting of heavy spar, silicic acid, graphite and soot.

3. A vibration damped sandwich system as recited in claim 1 comprising outer plates having a thickness ratio to one another of from 1:1 to 1:4.

* * * * *